(No Model.)
E. BLODGETT.
GRAIN TEMPERING MACHINE.
No. 570,449. Patented Nov. 3, 1896.
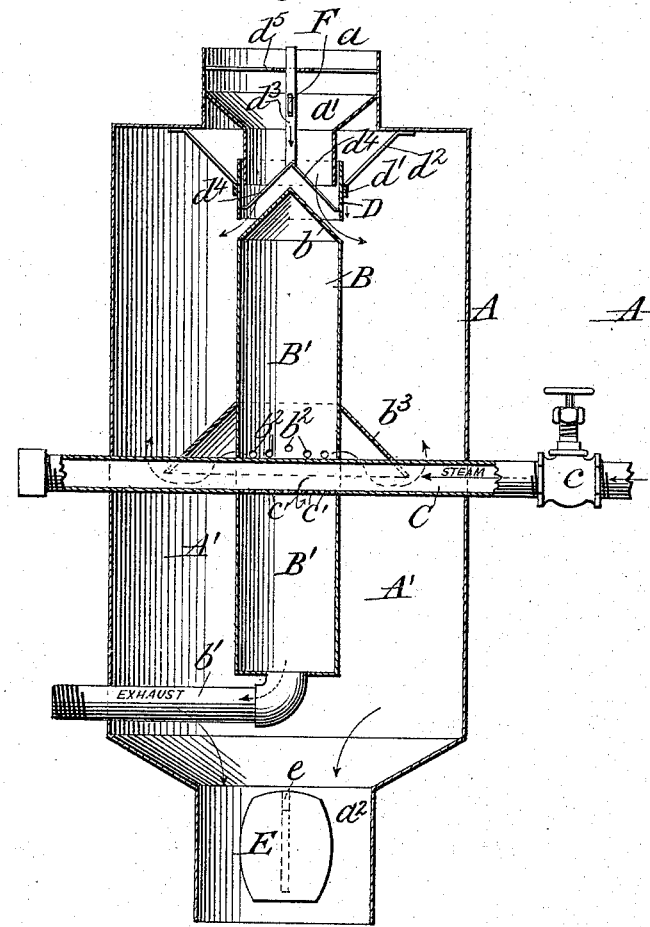
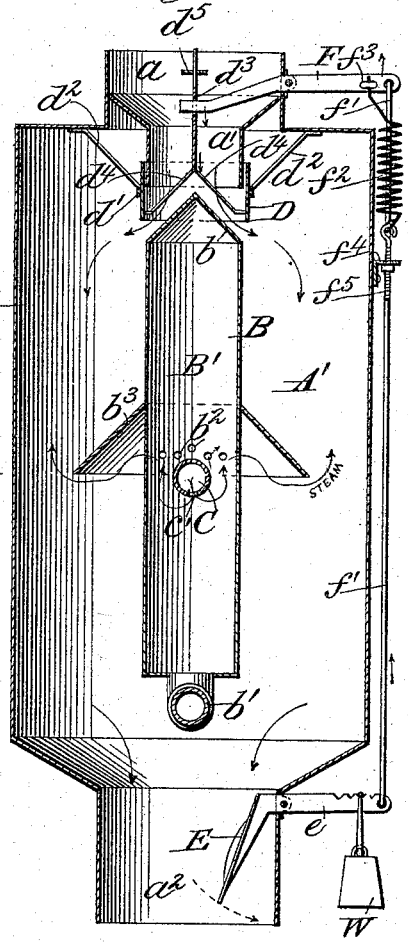
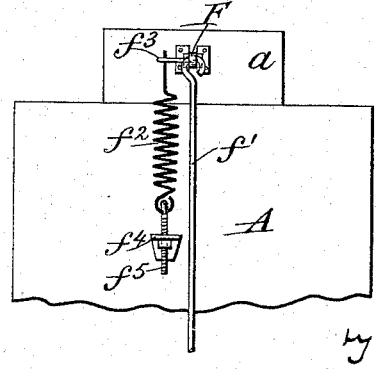
Attest:
F. H. Schott
N. D. Finckel
Inventor
Elbert Blodgett
by Grant Burroughs
atty.

UNITED STATES PATENT OFFICE.

ELBERT BLODGETT, OF MUSKEGON, MICHIGAN.

GRAIN-TEMPERING MACHINE.

SPECIFICATION forming part of Letters Patent No. 570,449, dated November 3, 1896.

Application filed March 10, 1896. Serial No. 582,571. (No model.)

*To all whom it may concern:*

Be it known that I, ELBERT BLODGETT, a citizen of the United States, residing at Muskegon, in the county of Muskegon and State of Michigan, have invented certain new and useful Improvements in Machines for Tempering Grain, of which the following is a full, clear, and exact description, such as will enable those skilled in the art to which it appertains to make and use the same, reference being had to the accompanying drawings, which form a part of this specification.

The invention relates to improvements in tempering-machines of that class in which grain is subjected to the action of live steam before it passes to the reducing mechanism. By this treatment the brittle bran is toughened and its removal from the kernel thereby facilitated. In ordinary practice this is done by projecting the steam directly upon the grain. This is objectionable, inasmuch as the steam, by reason of the pressure which it is under, often contains too much moisture. This excess of moisture, mixing with the grain, has a deleterious effect on the product. If the steam should contain less free moisture when mixed with the grain, the bran would still be sufficiently treated, and the deleterious effects occasioned by the presence of too much moisture would be obviated.

The invention in the present instance has for its object the provision of such a machine wherein the steam, before it is mixed with the grain, is freed to a considerable extent of an excess of moisture.

The invention also has for its object the provision of a valve mechanism by means of which the flow of grain through the machine is automatically regulated, so that the latter cannot be clogged or so much grain introduced into the steam-mixing chamber as to prevent a proper treatment of the same.

The invention consists in the novel construction, combination, and arrangement of parts, such as will be hereinafter fully described, pointed out in the appended claims, and illustrated in the accompanying drawings.

In the accompanying drawings, in which similar letters of reference designate corresponding parts, Figure 1 is a vertical sectional view of a machine embodying the invention. Fig. 2 is a similar view taken at right angles to that shown in Fig. 1. Fig. 3 is a detail view showing the tension device.

Referring to the drawings by letter, A designates the cylindrical shell which forms the casing of the device. It is mounted in the feed-pipe just before the latter reaches the reducing mechanism. In its upper end is mounted the induction-pipe $a$, which is connected with the main feed-pipe in any suitable manner. Mounted beneath the lower end of the induction-pipe is a funnel $a'$, that leads into the chamber formed by the casing A. The opening leading from the pipe $a$ into the said chamber is controlled by a valve mechanism hereinafter to be described. In the lower end of the casing A is mounted the eduction-pipe $a^2$. The size of the latter is the same as that of the induction-pipe $a$, and its upper end is flared to form a funnel-shaped opening into the casing. It is connected in any suitable manner with the pipe leading directly to the hopper that feeds the grain to the reducing stones or rolls, as the case may be.

A second cylindrical shell is mounted within the casing A. Its dimensions are considerably less than those of the former cylinder, and the two form the annular chamber $A'$. The upper end of the shell B is closed by the cap $b$, and its lower end has leading from the same the exhaust-pipe $b'$. It is placed intermediate of the induction-pipe $a$ and the eduction-pipe $a^2$ and forms the circular chamber $B'$.

Passing transversely through the casings or shells is the steam-pipe C, connected with a suitable generator. It is provided with a stop-cock $c$, whereby the flow of steam may be controlled. It passes through the chambers $A'$ and $B'$ somewhat below midway of the ends of the same. The under side of the portion that passes through the chamber $B'$ is provided with a series of openings $c'\ c'$, through which steam enters the said chamber.

The cylinder B is provided with a series of openings $b^2\ b^2$ just above where the steam-pipe C passes through. These openings allow the passage of steam from the chamber $B'$ into the chamber $A'$. On the outside of the cylinder B, and projecting over the openings $b^2\ b^2$ therein, is mounted the annular deflector $b^3$.

It is to be observed that the opening in the lower end of the funnel is directly over the conical cap $b$. This opening is controlled by an automatically-operated valve mechanism. On the lower end of the funnel is mounted the circular band or valve D, adapted to be seated on the conical cap $b$. The valve is guided by the band $d'$, supported by the rods $d^2 d^2$. A stem $d^3$ is connected with the valve by the rods $d^4 d^4$, and its upper end registers with the guide $d^5$.

In the eduction-pipe $a^2$ is mounted the damper-valve E. The latter is mounted on the inner end of the angular lever $e$, pivoted to the side of the pipe. The outer end of the lever projects through the pipe and beyond the casing A. On the outer end of the lever is adjustably mounted the weight W. The construction of the lever is such that when it is in its normal position its outer end is horizontal and the valve in an inclined position.

A lever F is pivoted to the side of the induction-pipe $a$ and projects into the same and has a sliding connection with the valve-stem $d^3$. The outer end of the lever projects beyond the casing A and is connected by the rod $f'$ with the outer end of the lever $e$. A tension device is connected with the outer end of the lever F. It consists of the coiled spring $f^2$, connected at its upper end with the arm $f^3$, projecting from the lever, and its lower end with the bracket $f^4$ by the adjusting-screw $f^5$.

The operation of the device is as follows: Steam is allowed to pass into the chamber B' from the pipe C, in which it expands, and by reason of its decreased pressure considerable of the moisture that has been held in suspension is deposited and the steam thereby dried to a considerable extent. The moisture collects in the lower part of the chamber and escapes through the exhaust-pipe $b'$. The comparatively dry steam then passes through the openings $b^2 b^2$ into the chamber A'. On passing through the openings it impinges on the deflector $b^3$ and is spread through the chamber. The grain to be treated is then allowed to enter the pipe $a$, from which it passes through the opening controlled by the valve D into the chamber A'. It strikes the conical cap or deflector $b$ and is spread through the annular chamber, where it enters the steam-bath. On its passage through the chamber the grain strikes the deflector $b^3$ and is spread through the steam just as the latter passes from under the said deflector. In this way the grain is thoroughly mixed with the steam and the treatment of each individual grain is insured. After treatment the grain passes through the eduction-pipe $a^2$ to the reducing mechanism.

The weight of the grain passing through the eduction-pipe, by acting on the damper-valve, through the intervening mechanism, operates the valve D to regulate the feed. If too much grain should enter, its weight on the damper-valve through the intermediate mechanism would move the valve D to more or less close the opening leading into the annular chamber and thereby decrease the flow of grain. After the grain pressing on the damper-valve has passed and the pressure relieved the weight W will operate to open the feed-regulating valve again. By means of the adjustable weight W and the adjustable tension-spring $f^2$ the facility with which the valve operated can be regulated.

While the embodiment of the invention as hereinbefore described is the preferred form, yet it can be departed from to a considerable extent without departing from the spirit of the invention.

Having thus described my invention, what I claim, and desire to secure by Letters Patent, is—

1. In a grain-tempering machine, the combination of a casing, mechanism for conveying steam into the same, a grain-induction pipe connected with said casing, a conical deflector mounted immediately beneath the opening of said pipe, a guide-band encircling the end of said pipe, a valve-band mounted on the end of said pipe between the same and the said guide-band and adapted to control the opening between the said pipe and the conical deflector, and mechanism for automatically moving said valve-band, substantially as described.

2. In a grain-tempering machine, the combination of a casing, mechanism for conveying steam into the same, grain induction and eduction pipes connected with said casing, a conical deflector mounted immediately beneath the opening of the induction-pipe, a guide-band encircling the end of said induction-pipe, a valve-band movably mounted on the end of said induction-pipe between the same and said guide-band and adapted to control the opening between the said pipe and the deflector, a lever pivoted to the casing and projecting into the grain-eduction pipe, the valve mounted on said lever within said eduction-pipe, and the intermediate mechanism connecting the outer end of said lever with the valve-band, substantially as described.

In testimony whereof I hereunto affix my signature in the presence of two witnesses.

ELBERT BLODGETT.

Witnesses:
 FRANK ALBERTS,
 FRANK H. SMITH.